US010099725B2

United States Patent
Ishii et al.

(12) United States Patent
Ishii et al.

(10) Patent No.: US 10,099,725 B2
(45) Date of Patent: Oct. 16, 2018

(54) VEHICLE BODY SIDE STRUCTURE

(71) Applicant: MITSUBISHI JIDOSHA KOGYO KABUSHIKI KAISHA, Tokyo (JP)

(72) Inventors: Sadayuki Ishii, Tokyo (JP); Hidetaka Inagaki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/513,867

(22) PCT Filed: Jan. 20, 2016

(86) PCT No.: PCT/JP2016/051555
§ 371 (c)(1),
(2) Date: Mar. 23, 2017

(87) PCT Pub. No.: WO2016/136339
PCT Pub. Date: Sep. 1, 2016

(65) Prior Publication Data
US 2017/0274936 A1    Sep. 28, 2017

(30) Foreign Application Priority Data
Feb. 25, 2015  (JP) .................................. 2015-035324

(51) Int. Cl.
*B62D 25/02* (2006.01)
*B62D 21/15* (2006.01)
(Continued)

(52) U.S. Cl.
CPC ......... *B62D 25/025* (2013.01); *B62D 21/157* (2013.01); *B62D 25/02* (2013.01);
(Continued)

(58) Field of Classification Search
CPC .. B62D 25/2036; B62D 25/02; B62D 25/025; B62D 21/157; B60J 5/0427;
(Continued)

(56) References Cited

U.S. PATENT DOCUMENTS 5,000,509 A * 3/1991 Sinnhuber .............. B60J 5/0451
296/187.12
7,837,255 B1 * 11/2010 Okutsu ................... B60J 5/0425
280/735
(Continued)

FOREIGN PATENT DOCUMENTS

JP    2004-224097 A    8/2004
JP    2007-62563 A     3/2007
(Continued)

OTHER PUBLICATIONS

Extended European Search Report dated Jun. 20, 2018, issued in the counterpart European Patent Application No. 16755089.6.

*Primary Examiner* — Gregory A Blankenship
(74) *Attorney, Agent, or Firm* — Birch, Stewart, Kolasch & Birch, LLP

(57) ABSTRACT

A vehicle body side structure includes: a side sill extending in a longitudinal direction of a vehicle at a side bottom of the vehicle and having a recess sagging inward in a width direction of the vehicle; a door being hollow, having a door bottom portion disposed so as to overlap the side sill when seen from a side, and being arranged at an outer side of the side sill in the width direction; and a force transferring member having a projection protruding inward in the width direction, being disposed in a hollow interior of the door bottom portion, and being configured to transfer force acting inward in the width direction to the side sill.

20 Claims, 3 Drawing Sheets

(51) Int. Cl.
*B60J 5/04* (2006.01)
*B62D 25/20* (2006.01)

(52) U.S. Cl.
CPC ............ *B60J 5/0427* (2013.01); *B60J 5/0456* (2013.01); *B60J 5/0458* (2013.01); *B62D 21/15* (2013.01); *B62D 25/2036* (2013.01)

(58) Field of Classification Search
CPC ........ B60J 5/0443; B60J 5/0444; B60J 5/045; B60J 5/0456; B60J 5/0458
USPC .................................. 296/187.12, 209, 146.6
See application file for complete search history.

(56) References Cited

U.S. PATENT DOCUMENTS

| | | | | |
|---|---|---|---|---|
| 8,007,032 B1* | 8/2011 | Craig | ................... | B62D 25/025 296/187.12 |
| 2005/0023859 A1* | 2/2005 | Ali | ........................ | B60J 5/0451 296/146.6 |
| 2005/0127715 A1* | 6/2005 | Carre | .................... | B60J 5/0458 296/187.12 |
| 2006/0001294 A1* | 1/2006 | Balgaard | ............. | B62D 25/025 296/209 |
| 2007/0063543 A1* | 3/2007 | Roccato | ............... | B62D 21/157 296/187.08 |
| 2007/0210612 A1* | 9/2007 | Kidachi | ................. | B60J 5/0418 296/146.6 |
| 2009/0184501 A1* | 7/2009 | Hirotani | ................ | B60J 5/0451 280/730.2 |
| 2010/0038931 A1* | 2/2010 | Ihashi | ..................... | E05F 5/003 296/209 |
| 2010/0244485 A1* | 9/2010 | Tanaka | ................. | B62D 21/157 296/187.08 |
| 2010/0276960 A1* | 11/2010 | Torii | .................... | B60N 2/4235 296/63 |
| 2010/0295335 A1* | 11/2010 | DeVor | .................. | B60N 2/4235 296/187.12 |
| 2011/0169302 A1* | 7/2011 | Deng | ....................... | B60J 5/042 296/187.12 |
| 2011/0254320 A1* | 10/2011 | Mori | ...................... | B62D 25/02 296/209 |
| 2012/0086238 A1* | 4/2012 | Tan | ....................... | B62D 25/02 296/209 |
| 2013/0168997 A1* | 7/2013 | Kurokawa | ............. | B60J 5/0443 296/146.6 |
| 2014/0125089 A1* | 5/2014 | Rachfahl | ............... | B62D 21/157 296/187.12 |
| 2015/0076864 A1* | 3/2015 | Faruque | ................. | B60J 5/0458 296/187.12 |
| 2015/0097390 A1* | 4/2015 | Dettling | ................ | B60J 5/0427 296/146.6 |
| 2015/0123427 A1* | 5/2015 | Faruque | ................. | B60J 5/0461 296/187.12 |
| 2015/0145288 A1* | 5/2015 | Kellner | ................ | B62D 25/025 296/209 |
| 2015/0314808 A1* | 11/2015 | Jenkins | ................ | B62D 21/157 296/187.12 |
| 2016/0083017 A1* | 3/2016 | Sakaguchi | ........... | B62D 21/157 296/187.12 |
| 2017/0274936 A1* | 9/2017 | Ishii | ....................... | B62D 25/02 |
| 2017/0326954 A1* | 11/2017 | Peidro Aparici | ...... | B60J 5/0427 |

FOREIGN PATENT DOCUMENTS

| | | |
|---|---|---|
| JP | 2008-254709 A | 10/2008 |
| JP | 2008-290505 A | 12/2008 |
| JP | 2009-214791 A | 9/2009 |

* cited by examiner

VEHICLE BODY SIDE STRUCTURE

FIELD

The present invention relates to a vehicle body side structure configured to transfer force being input to a side door of a vehicle and acting inward in the width direction of the vehicle to a side sill.

Vehicles have sides each equipped with a door that opens and closes an opening provided for passengers to enter and exit and a side sill that forms a bottom frame of the opening. A traditional door is ensured to have shock absorbability for impacts in a width direction of the vehicle by being formed in a hollow shape. The side sill is one of members that construct a frame of a vehicle body, and is ensured to have strength and rigidness by being formed in a closed section. The side sill is bound together with other frame members, such as pillars that form front and rear frames of the opening and cross members that support a floor of the interior of the vehicle.

In such a structure of the side of the vehicle, it has been considered to transfer force (side collision force) input to the door to the side sill, for the purpose of enhancing protectability for passengers in the event of side collisions. In other words, the structure can enhance the protectability for passengers by inhibiting the door from entering the interior of the vehicle with reaction force that acts on the door from the side sill against the side collision force transferred from the door to the side sill. The structure disclosed in Patent Literature 1, for example, forms a bottom end of a hollow door in the shape of a plate extending along the substantial horizon, and disposes the bottom end in such a manner that the bottom end overlaps the side sill when seen from the side. According to this kind of the structure, the side collision force may be transferred from the bottom end of the door to the side sill, due to the bottom end coming to butt the side sill in the event of side collisions.

CITATION LIST

Patent Literature

Patent Literature 1: Japanese Patent Laid-Open No. 2009-214791

SUMMARY

Technical Problems

However, the structure which disposes the bottom end of the door at the height of the side sill, as described in Patent Literature 1, has a possibility of absorbing the side collision force due to buckling of the bottom end of the door and/or crushing of the hollow part of the door. The structure also has a possibility of displacing (offsetting) the bottom end of the door having butted the side sill. For these reasons, the structure may reduce the side collision force to be transferred to the side sill. If the side collision force transferred to the side sill is inadequate, sufficient reaction force from the side sill to the door may not be ensured to inhibit the door from entering the interior of the vehicle. In cases where the insufficient side collision force is transferred to the side sill under the configuration of the vehicle having a frame member to which an impact detecting sensor that detects a side collision of the vehicle is attached, a time lag between the occurrence of the side collision and the detection may increase to delay the start of the control (e.g., control to expand the air bags) to protect passengers. Accordingly, the structure described in Patent Literature 1, for example, still has issues to be improved in the viewpoint of enhancing the protectability of passengers in the event of side collisions.

With the foregoing problems in view, one of the objects of the present disclosure is to provide a vehicle body side structure that can enhance the protectability of the passenger. In addition to the above object, advantageous effects that are introduced from each configuration in the following "embodiments to carry out the invention" but traditional techniques have not achieved can be also regarded as other objects of the present invention.

(1) The vehicle body structure disclosed herein includes: a side sill extending in a longitudinal direction of a vehicle at a side bottom of the vehicle and having a recess sagging inward in a width direction of the vehicle; a door being hollow, having a door bottom portion disposed so as to overlap the side sill when seen from a side, and being arranged at an outer side of the side sill in the width direction; and a force transferring member having a projection protruding inward in the width direction, being disposed in a hollow interior of the door bottom portion, and being configured to transfer force acting inward in the width direction to the side sill. The recess and the projection are preferably formed into shapes compatible with each other.

(2) The side sill preferably has a side face portion formed into a sheet shape on an outer side of the side sill in the width direction. In this case, the force transferring member is preferably disposed so as to overlap the side face portion when seen from the side.

(3) Preferably, a vertical length of the projection is set shorter than a vertical length of the recess. In other words, the projection preferably has a vertical length shorter than the vertical length of the recess.

(4) Preferably, the projection is disposed below the recess.

(5) The side sill is preferably bound together with a cross member extending in the width direction. The force transferring member is preferably disposed so as to overlap the cross member when seen from the side. This means that it is preferable that the force transferring member is disposed so as to overlap both the side sill and the cross member when seen from the side.

(6) The force transferring member preferably extends between a rear end of the door bottom portion and a position at a front side of a seat installed in the vehicle.

(7) The force transferring member preferably forms a closed section in the hollow interior of the door bottom portion.

(8) The force transferring member preferably includes a resin material formed by foam molding.

(9) The force transferring member preferably includes a steel formed by bending.

(10) The force transferring member is preferably a solid member.

Effects of Invention

Since the force transferring member of the disclosed vehicle body side structure is disposed in the hollow interior of the door bottom portion overlapping the side sill when being seen from the side, a force applied to the door and directing inward in the width direction of the vehicle can be rapidly transferred to the side sill through the force transferring member. This inhibits the door from entering the interior of the vehicle. For example, in cases where a side collision is detected on the basis of the impact transferred to the side sill, the side collision can be detected earlier.

Since the side sill has the recess and the force transferring member has the projection, displacement of the door bottom portion inward in the width direction causes the projection to fit into the recess, so that the force being input into the door and acting inward in the width direction can be rapidly transferred to inhibit offset of the bottom portion of the door. The recess and projection also inhibit the door from entering the interior of the compartment, and make it possible to detect a side collision earlier. Consequently, protectability of passengers can be enhanced.

EMBODIMENTS TO CARRY OUT INVENTION

Hereinafter, description will now be made in relation to an embodiment of a vehicle body side structure with reference to the accompanying drawings. The following embodiment is exemplary, so there is no intention to limit applications of various modifications and techniques not explicitly described in the following description to the embodiment.

In the following description, on the basis of a vehicle in a horizontal posture, the forward traveling direction is referred to as forward; the opposite direction to the forward is referred to as "rearward"; and the left and right direction is defined on the basis of the forward. The direction from the forward to the rear and vice versa is also referred to as the longitudinal direction and the direction from the left to the right and vice versa is also referred to as the width direction. In the center portion of the vehicle in the width direction, an interior is provided, so the inward in the width direction is also referred to as an interior side.

[1. Configuration]

The vehicle body side structure according to an embodiment is one providing a force transferring member inside the door such that the force applied to the door when, for example, a side collision, is transferred to frame members such as the side sill of the vehicle body. Hereinafter, description will now be made in relation to the basic structure of and around the side portion of a vehicle body, and then to the detailed structures of the side sill, the door, and the force transferring member.

Figure 1:
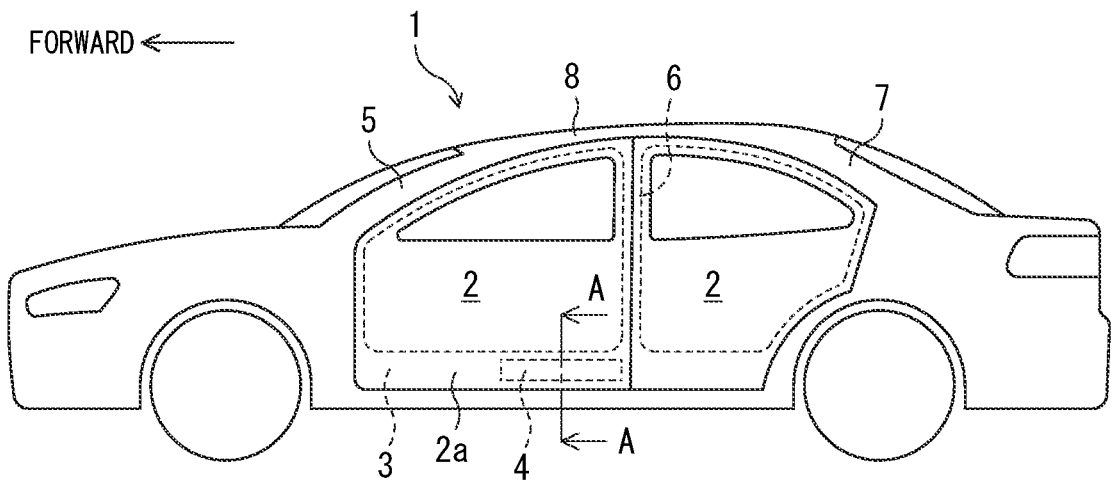
FIG. 1 is a side view of a vehicle to which a vehicle body side structure of an embodiment is applied.

The vehicle body side structure of the present embodiment is applied to the side portion of a vehicle body of a vehicle 1 illustrated in FIG. 1. This example adopts a monocoque structure in which components (frame members) that form the frame of the vehicle body are integral with panel members that couple the components to form a single body. On each side of the vehicle body, an opening (hereinafter referred to as "entrance opening") is provided for passengers to enter and exit. The entrance opening is enclosed by a side sill 3 serving as a frame of the bottom portion, a roof side rail 8 serving as a frame of the top portion, and pillars 5-7 serving as frames of the side portions. The side sill 3, the roof side rail 8, and the pillars 5-7 are regarded as components shaping the frame of the vehicle body side.

The side sill 3 extends along each of the left and right edge sides of the interior floor in the longitudinal direction. The roof side rail 8 extends along each of the left and right edge sides of the interior ceiling in the longitudinal direction. The pillars 5-7 are vertically arranged between the side sill 3 and the roof side rail 8.

The pillars 5-7 are aligned in the order of an A-pillar 5, a B-pillar 6, and a C-pillar 7 in the longitudinal direction (i.e., from the front to the rear). The pillars 5-7 are spaced apart from one another. Specifically, on each side of the vehicle body, two entrance openings segmented by the B-pillar 6 are aligned in the front-to-rear direction. These entrance openings are opened and shut by respective doors 2. Hereinafter, description will be made, focusing on the vehicle body side structure of the door 2 that opens and closes the forward-side entrance opening and the portion around the door 2.

Figure 2:
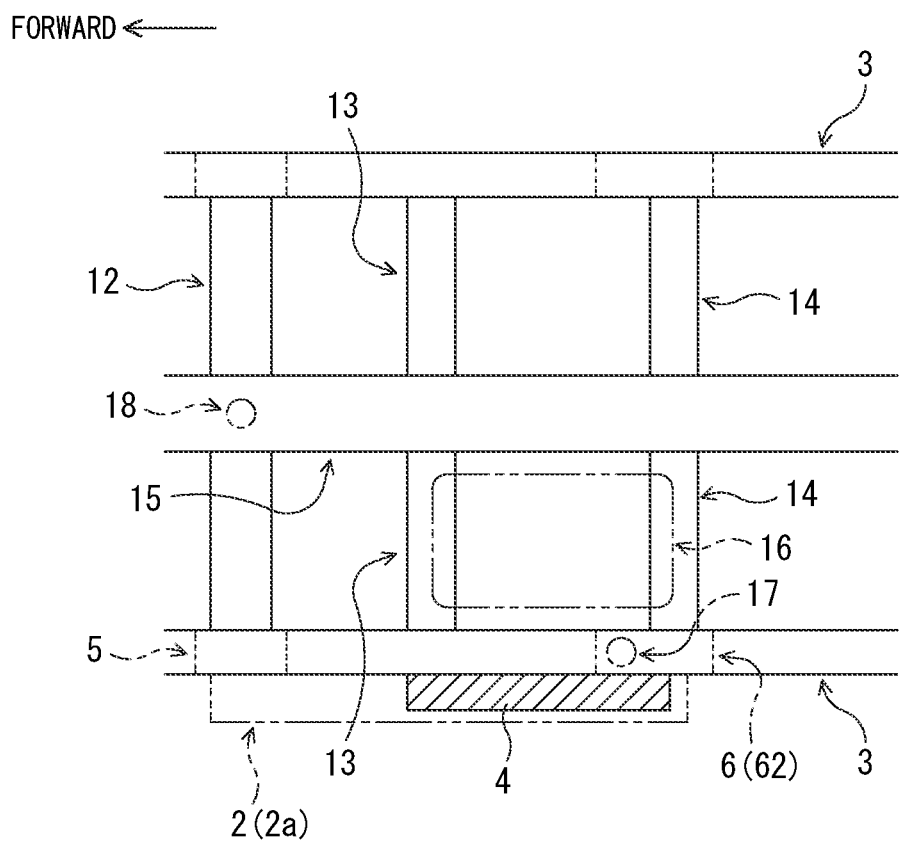
FIG. 2 is a top view illustrating a frame structure of a bottom portion of the vehicle of FIG. 1.

As illustrated in FIG. 2, cross members 12-14 extending along the width direction are coupled to the side sill 3. To the cross members 12-14, a backbone 15 extending in the longitudinal direction is coupled at the center of the vehicle 1 of the width direction. This means that the cross members 12-14 are directly coupled to the side sill 3 and the backbone 15 is indirectly coupled to the side sill 3 via the cross members 12-14. The side sill 3, the cross members 12-14, and the backbone 15 are components that form the frame of the bottom portion of the vehicle body.

The cross members 12-14 are aligned in the order of a dash cross member 12, a seat front cross member 13, and a seat rear cross member 14 in the longitudinal direction (i.e., from the front to the rear). The dash cross member 12 is arranged along the bottom edge side of a non-illustrated dash panel vertically arranged at the front end of the interior. To the seat cross members 13, 14, a seat (driver's seat or passenger seat, for example) 16 is installed via a non-illustrated supporting member. The seat front cross member 13 is provided below the front end of the seat 16 and the seat rear cross member 14 is provided below the rear end of the seat 16.

The front end of the side sill 3 is bound to the dash cross member 12 on the inward thereof in the width direction and is bound to the A-pillar 5 on the top thereof. In other words, a position of the side sill 3 where the dash cross member 12 is bound and a position of the side sill 3 where the A-pillar 5 is bound are aligned in the width direction when seen from the top.

The center portion of the side sill 3 in the longitudinal direction is bound to the seat rear cross member 14 on the inward thereof in the width direction and is bound to the B-pillar 6 on the top thereof. In other words, a position of the side sill 3 where the seat rear cross member 14 is bound and a position of the side sill 3 where the B-pillar 6 is bound are aligned in the width direction when seen from the top.

The seat front cross member 13 is bound to the inward of the side sill 3 in the width direction between the position where the dash cross member 12 is bound and the position where the seat rear cross member 14 is bound.

Figure 3:
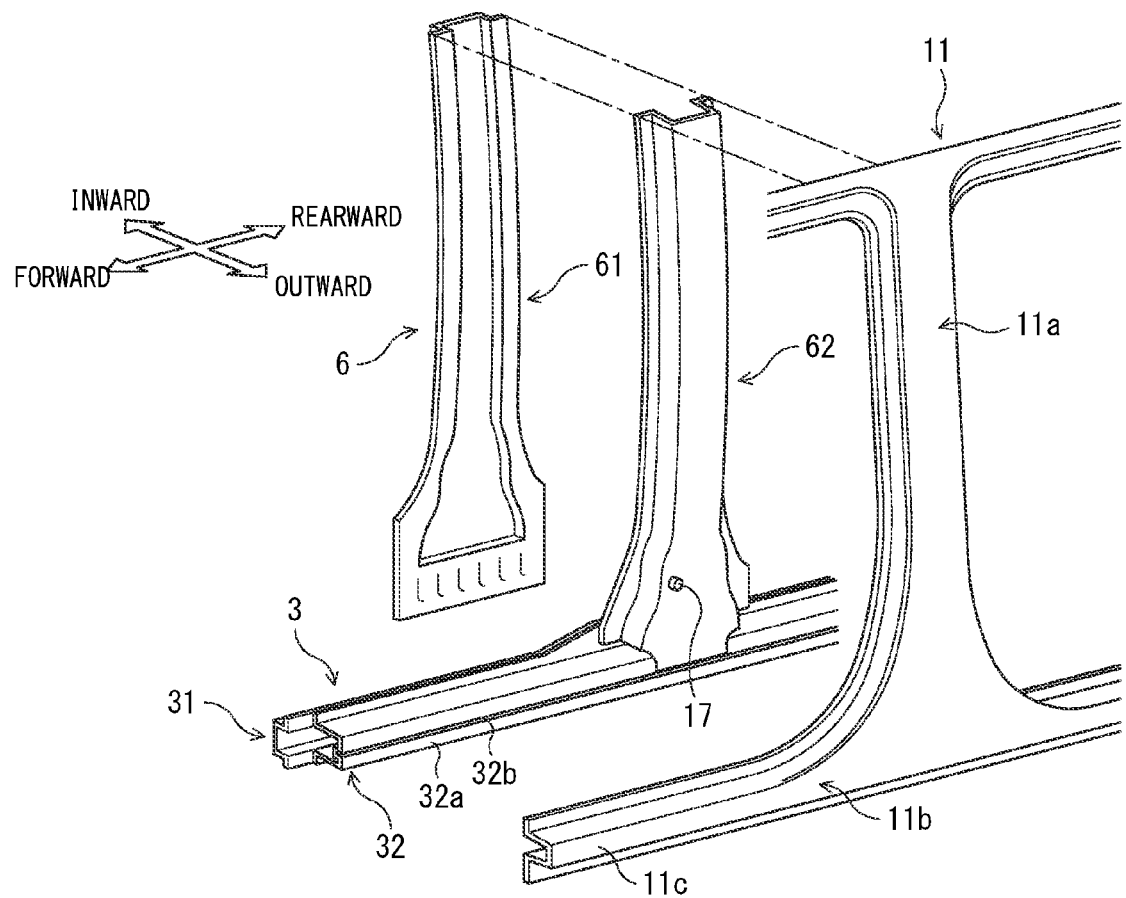
FIG. 3 is an exploded perspective view illustrating a frame structure of a side portion of the vehicle of FIG. 1.

As illustrated in FIG. 3, the B-pillar 6 and the side sill 3 are disposed on the inward of a common outer panel 11 in the width direction. The outer panel 11 serves part of the exterior panel of the vehicle body structure. The outer panel 11 includes a pillar part 11a and a sill part 11b. The pillar part 11a, which extends vertically, serves as the exterior panel of the B-pillar 6. The pillar part 11a has a horizontal section in the form of a hat swelling outward in the width direction. The sill part 11b, which extends in the longitudinal direction at the bottom end of the pillar part 11a, serves as the exterior panel of the side sill 3. The sill part 11b has a vertical section in the form of a hat swelling outward in the width direction. Here, having a hat-shaped section means having a shape that projects a flange face from each side edge of a member forming a groove of a channel-shaped section.

Hereinafter, description will now be made in relation to, in sequence, the B-pillar 6 and the side sill 3.

The B-pillar 6 includes the pillar part 11a, and a pillar reinforcement member 62 and a pillar inner member 61. The pillar reinforcement member 62 and the pillar inner member are disposed on the inward of the pillar part 11a in the width direction. The pillar reinforcement member 62 has a horizontal section in the form of a hat swelling outward in the width direction, for example, and the pillar inner member 61 has a horizontal section in the form of a hat swelling inward in the width direction. Overlaying the flange faces of the pillar reinforcement member 62 onto the flange faces of the pillar inner member 61 and coupling the faces to each other form a closed section frame vertically extending in the B-pillar 6. Overlaying the flange faces of the pillar part 11a onto the flange faces of the pillar reinforcement member 62 and coupling the faces to each other also form a closed section frame vertically extending in the B-pillar 6. Accordingly, the B-pillar 6 has a structure of double closed sections.

The side sill 3 includes the sill part 11b, a sill reinforcement member 32, and a sill inner member 31. The sill reinforcement member 32 and the sill inner member 31 are disposed on the inward of the sill part 11b in the width direction. The sill reinforcement member 32 has a vertical section in the form of a hat swelling outward in the width direction, for example, and the sill inner member 31 has a vertical section in the form of a hat swelling inward in the width direction. Overlaying the flange faces of the sill reinforcement member 32 onto the flange faces of the sill inner member 31 and coupling the faces to each other form a closed section frame extending in the longitudinal direction in the side sill 3. Overlaying the flange faces of the sill part 11b onto the flange faces of the sill reinforcement member 32 and coupling the faces to each other also form a closed section frame extending in the longitudinal direction in the side sill 3. Accordingly, the side sill 3 has a structure of double closed sections as with the B-pillar 6.

A side face portion 11c in the form of a sheet is formed on the outer side of the sill part 11b in the width direction. The side face portion 11c is a sheet-shaped portion vertically arranged on the outward of the hat-shaped section in the width direction, and is the outermost part of the side sill 3 in the width direction. The direction of the surface of the side face portion 11c is set such that the normal thereof extends along the width direction.

A reinforcement face portion 32a, which extends in parallel with the side face portion 11c, is provided to the sill reinforcement member 32. On the reinforcement face portion 32a, a recess 32b that sags inward in the width direction is formed. The reinforcement face portion 32a corresponds to the sheet-shaped portion vertically arranged on the outer side of the hat-shaped section in the width direction and reinforces the side face portion 11c. The recess 32b aims at enhancing the rigidness of the reinforcement face portion 32a and extends in the longitudinal direction. The recess 32b is formed by bending the reinforcement face portion 32a, for example.

As illustrated in FIG. 2, two sensors 17, 18 are provided to the components forming the frame of the vehicle body of the present embodiment. The sensors 17, 18 are provided to perceive collisions of the vehicle 1 and detect, for example, an impact input in the vehicle body or an acceleration of the vehicle 1. For instance, the sensor 17 is attached to the bottom portion of the pillar reinforcement member 62 and perceives side collisions of the vehicle 1 by detecting an acceleration in the width direction. The other sensor 18 is attached to the front end portion of the backbone 15 and perceives side collisions of the vehicle 1. In addition, the sensor 18 perceives frontal collisions of the vehicle 1 by detecting an acceleration in the longitudinal direction.

The vehicle 1 carries out passenger protection control on the vehicle 1 on the basis of the information detected by the sensors 17, 18. For example, in cases where accelerations detected by the sensors 17, 18 both exceed the respective thresholds, the vehicle 1 is determined to have been collided on the side and immediately after the determination, the passenger protection control exemplified by activating the air-bag devices and/or the seat-belt auto-tensioners each installed in the vehicle is carried out.

Here, description will now be described in relation to the door 2 and a force transferring member 4 disposed inside the hollow interior of the door 2. The following description assumes the door 2 is closing the entrance opening.

The door 2 is disposed outward of the side sill 3 in the width direction. The front end of the door 2 is disposed so as to be aligned with the front end of the side sill 3 (where the dash cross member 12 and the A-pillar 5 are bound to the side sill 3) outwardly in the width direction. The rear end of the door 2 is disposed so as to be aligned with the center portion of the side sill 3 (where the seat rear cross member 14 and the B-pillar 6 are bound to the side sill 3) in the width direction.

Figure 4:
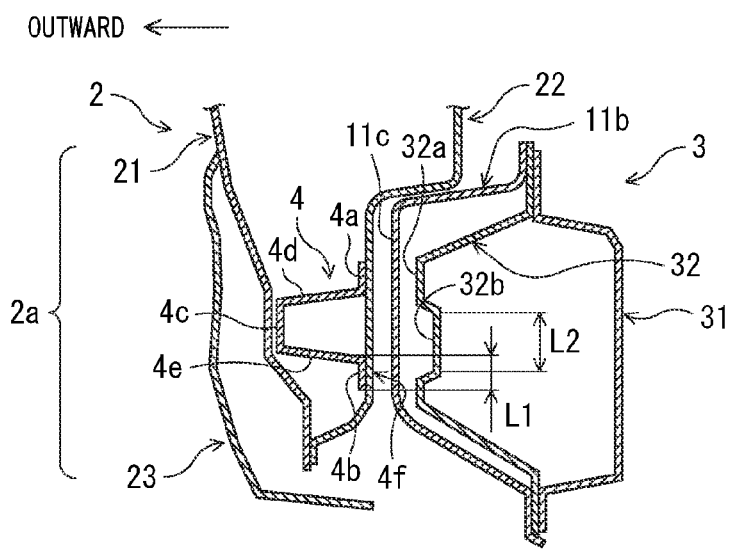
FIG. 4 is a vertical sectional view (A-A section of FIG. 1) illustrating the main part of the side portion of the vehicle of FIG. 1.

As illustrated in FIG. 4, a bottom portion 2a (hereinafter also referred to as a "door bottom portion 2a") of the door 2 is disposed so as to overlap the side sill 3 when seen from the side. In other words, the bottom end of the door 2 is placed below the top end of the side sill 3. In the hollow interior of the door bottom portion 2a, the force transferring member 4 is disposed. The force transferring member 4 aims at transferring a force that is input in the door 2 and acts inward in the width direction to the side sill 3. The force transferring member 4 is disposed inside the hollow interior of the door 2 at such a height that the force transferring member 4 overlaps the side sill 3 when seen from the side.

The door 2 includes a door outer panel 21 and a door inner panel 22, which are made of steel. The door outer panel 21 serves as the exterior panel of the vehicle 1. The door inner panel 22 is disposed on the inward of the door outer panel 21 in the width direction and is bound to the door outer panel 21. Since the door outer panel 21 and the door inner panel 22 are formed so as to swell outward and inward in the width direction, respectively, the door 2 is formed to be hollow.

At the outer side of the door bottom portion 2a in the width direction, a door garnish 23 for decorating the door 2 is provided. The door garnish 23 has a vertical section in an L shape, for example. The door garnish 23 extends along the door bottom portion 2a in the longitudinal direction, and for example, the both ends of the door garnish 23 in the longitudinal direction are attached to the door 2.

The force transferring member 4 is formed from a bent steel member and has a hat-shaped section swelling outward in the width direction. Specifically, the force transferring member 4 includes an upper flange portion 4a, a lower flange portion 4b, an outer side face portion 4c, an upper conjunction face portion 4d, and a lower conjunction face portion 4e.

The upper flange portion 4a and the lower flange portion 4b correspond to plane collars vertically extending on the inward of the hat-shaped section in the width direction. The outer side face portion 4c corresponds to a plane crest portion vertically extending at the outer end of the hat-shaped section in the width direction. The outer side face portion 4c is arranged along the door outer panel 21. The upper conjunction face portion 4d is a plane portion that connects the top side of the outer side face portion 4c and the bottom side of the upper flange portion 4a, and is arranged to have an upward gradient to the inward in the width direction. The lower conjunction face portion 4e is a plane portion that connects bottom side of the outer side face portion 4c and the top side of the lower flange portion 4b, and is arranged to have a downward gradient to the inward in the width direction.

The lower flange portion 4b and the lower conjunction face portion 4e are arranged inward of the outer side face portion 4c in the width direction and inwardly project in the width direction. Hereinafter, the projecting portion is referred to as a projection 4f. The projection 4f aims at inhibiting the door 2 from entering the interior (inwardly in the width direction) and is formed into a shape compatible with the recess 32b of the side sill 3. Specifically, the projection 4f corresponds to a combination of the lower flange portion 4b and a portion of the lower conjunction face portion 4e, the portion extending outward from the lower flange portion 4b for a length corresponding to the depth (i.e., the length of the width direction) of the recess 32b. In the present embodiment, the vertical length L1 of the projection 4f is set shorter than the vertical length L2 of the recess 32b (L1<L2). The projection 4f is formed below the recess 32b. This means that the top end of the projection 4f is positioned lower than the top end of the recess 32b.

The force transferring member 4 forms a closed section in the hollow interior of the door bottom portion 2a with the upper and lower flange portions 4a, 4b bound to the door inner panel 22. In the present embodiment, the force transferring member 4 and the door inner panel 22 form a trapezoid closed section extending in the longitudinal direction. A minute space is kept between the outer side face portion 4c and the door outer panel 21.

The force transferring member 4 is arranged at the same height as the side face portion 11c of the outer panel 11 so as to be opposite to the side face portion 11c. In the present embodiment, the entire part of the force transferring member 4 overlaps the side face portion 11c when seen from the side. In addition, the entire part of the force transferring member 4 also overlaps the reinforcement face portion 32a when seen from the side. Namely, the force transferring member 4 has the upper flange portion 4a arranged lower than the upper end of the reinforcement face portion 32a and the lower flange portion 4b arranged higher than the lower end of the reinforcement face portion 32a.

As illustrated in FIG. 2, the force transferring member 4 is disposed so as to overlap both the seat front cross member 13 and the seat rear cross member 14 when seen from the side. In other words, the force transferring member 4 is disposed between the rear end of the door bottom portion 2a and a position in front of the seat 16. In the illustrated example, the force transferring member 4 extends between a position slightly forward to the rear end of the door bottom portion 2a and a position slightly in front of the seat 16.

[2. Action]

Figure 5A:
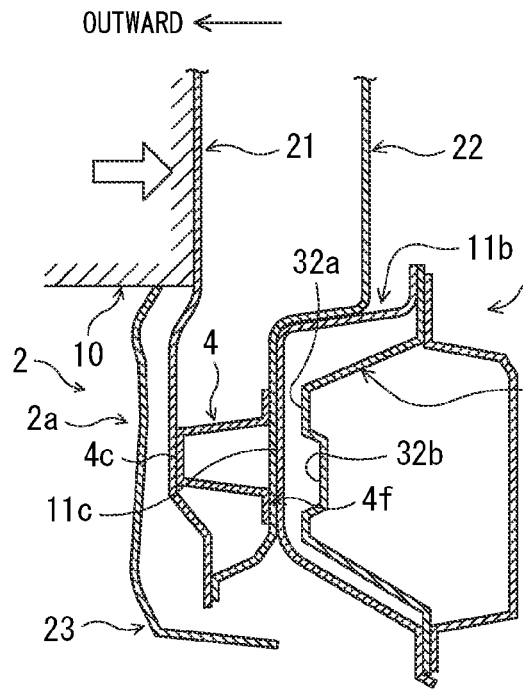
FIG. 5 is a diagram illustrating a state of deformation of the side portion of FIG. 4 in the event of a side collision, FIG. 5A illustrating deformation at a moment when the side collision force is transferred to the side sill and FIG. 5B illustrating the deformation after the time point of FIG. 5A.
Figure 5B:
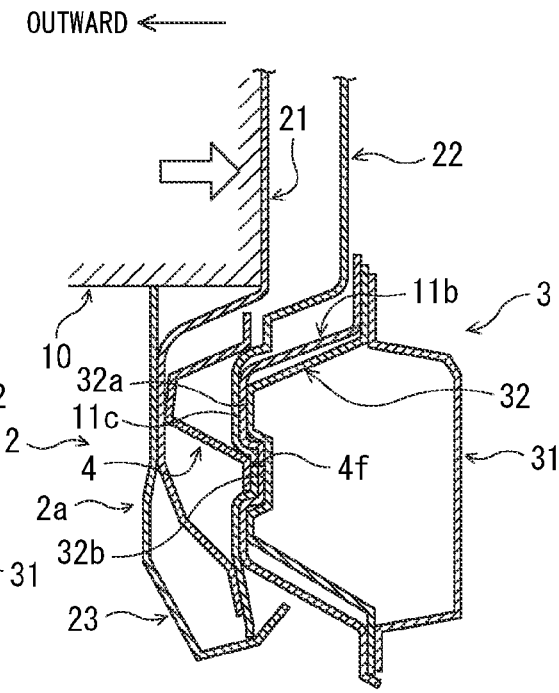

FIGS. 5A and 5B illustrate examples of states of deformation of the door 2 when the vehicle 1 has a side collision. In these examples, the collision counterpart 10 moves inwardly in the width direction from outer side and collies with the door 2 at a portion upper than the force transferring member 4.

When the collision counterpart 10 collides with the door 2 in the event of the side collision of the vehicle 1, a side collision force (represented by a white arrow) acting inwardly from the outer side is input into the door outer panel 21. The side collision force causes the door outer panel 21 to move inward in the width direction (to the interior). In the meantime, the door outer panel 21 is deformed so as to crush the hollow interior between the door outer panel 21 and the door inner panel 22, and approaches the door inner panel 22.

After the door outer panel 21 at the door bottom portion 2a is inwardly displaced in the width direction for the space between the door outer panel 21 and the force transferring member 4, the door outer panel 21 comes in contact with the outer side face portion 4c of the force transferring member 4. This means that the door outer panel 21 comes into contact with the force transferring member 4 before coming into contact with the door inner panel 22.

At this incidence, the door outer panel 21 is brought into contact with the outer side face portion 4c of the force transferring member 4 to transfer the side collision force. The side collision force is transferred from the outer side face portion 4c through the conjunction face portions 4d, 4e to the flange portions 4a, 4b and then transferred from the flange portions 4a, 4b to the door inner panel 22. In this manner, the side collision force is transferred inwardly in the width direction by the force transferring member 4 in the hollow interior of the door bottom portion 2a (i.e., between the door outer panel 21 and the door inner panel 22).

The door inner panel 22 is pressed inward in the width direction by the side collision force transferred from the force transferring member 4, and is consequently displaced toward the side sill 3. Then, as illustrated in FIG. 5A, the door inner panel 22 is brought into contact with the side face portion 11c of the side sill 3. At this time, the side collision force is transferred from the door inner panel 22 at the door bottom portion 2a to the side sill 3. The side collision force transferred to the side sill 3 is further transferred to the B-pillar 6, and also transferred through the cross members 12-14 to the backbone 15. The impact is finally detected by the sensors 17, 18.

On the other hand, a reaction force acting from the side face portion 11c to the door inner panel 22 is generated on the door inner panel 22 at the surface being in contact with the side face portion 11c. When the side face portion 11c is deformed inward in the width direction and brought into contact with the reinforcement face portion 32a of the reinforcement member 32 by being pressed inwardly in the width direction by the door bottom portion 2a, a reaction force acting from the reinforcement face portion 32a to the side face portion 11c is generated on the side face portion 11c at the surface being in contact with the reinforcement face portion 32a. Such successive generations of the reaction forces at the contacting surfaces inhibit the sill part 11b from entering inward in the width direction and further inhibit the door bottom portion 2a from entering inward in the width direction.

Increase in an amount of the entrance of the collision counterpart 10 to the interior causes the door 2 to enter inward in the width direction at a portion higher than the door bottom portion 2a. Consequently, the door bottom portion 2a and the force transferring member 4 disposed in the hollow interior of the door bottom portion 2a are drawn in an oblique direction going upward and inward in the width direction, and are displaced in the upward oblique direction and inward in the width direction.

Then, as illustrated in FIG. 5B, the projection 4f of the force transferring member 4 comes to fit into the recess 32b of the side sill 3. Under a state where the projection 4f is fitting in the recess 32b, the projection 4f is caught by the recess 32b to inhibit the door bottom portion 2a from being displaced inward in the width direction and/or vertically.

As the above, in the vehicle 1, since the door bottom portion 2a is inhibited from entering inward in the width direction and from being deformed, the entire door 2 is inhibited from entering the interior. This prevents the door 2 from largely entering the interior in the event of a side collision of the vehicle 1.

[3. Effects]

(1) The above vehicle body side structure installs the force transferring member 4 in the hollow interior of the door bottom portion 2a which is disposed so as to overlap the side sill 3 when seen from the side. This can rapidly transfer the force, which is input into the door 2 and acting inward in the width direction, to the side sill 3 through the force transferring member 4.

In contrast to the above, in a structure that does not install the force transferring member 4, the force acting inward in the width direction at the door bottom portion 2a is transferred from the door outer panel 21 to the door inner panel 22 brought into contract with the door outer panel 21 after the hollow interior of the door 2 is crushed and deformed. As such, in the structure without the force transferring member 4, the force is transferred after the hollow interior of the door 2 is deformed to an extent that the door outer panel 21 is brought into contact with the door inner panel 22 (i.e., after the door outer panel 21 runs freely), causing delay in force transfer to the side sill 3.

In contrast, according to the vehicle body side structure with the force transferring member 4, since the door outer panel 21 comes into contact with the force transferring member 4 before being brought into contact with the door inner panel 22, the force transfer inside the hollow interior of the door bottom portion 2a can be advanced and consequently, the force transfer to the side sill 3 can also be advanced. This enables the sensors 17, 18 to detect an impact transferred from the side sill 3 to the B-pillar 6 or the backbone 15 earlier. In other words, the time lag between the occurrence of a side collision of the vehicle 1 and the detection of the side collision can be shortened. Consequently, the start of the passenger protection control after the occurrence of a side collision can be hastened, so that the passenger protectability can be enhanced.

The recess 32b is provided to the side sill 3 and the projection 4f is provided to the force transferring member 4. In addition, the recess 32b and the projection 4f are formed into the shapes compatible with each other. With this configuration, when the door bottom portion 2a is displaced inward in the width direction, the projection 4f is fitted into the recess 32b to inhibit the door bottom portion 2a, which is coupled to the projection 4f, from being displaced. This inhibits the door 2 from entering the interior, so that the passenger protectability can be further enhanced. The projection 4f fitting into the recess 32b can rapidly transfer the force input into the door 2 and acting inward in the width direction to the side sill 3. This allows the sensors 17, 18 to detect an impact earlier. In view of detecting an impact earlier by the sensors 17, 18 also, the projection 4f and the recess 32b can enhance the passenger protectability.

Since the force transferring member 4 is disposed at a position where the force transferring member 4 overlaps the side sill 3 when seen from the side, the side collision force can be efficiently transferred to the side sill 3 through the force transferring member 4. Specifically, since the direction of arranging the force transferring member 4 and the side sill 3 conforms to the direction of the side collision force to be input to the door 2, the side collision force is surely transferred to the side sill 3 as compared with cases where the force transferring member 4 is disposed at a level higher or lower than the side sill 3. This enhances the detection responsiveness of the sensors 17, 18, so that reliability in detecting side collisions can be enhanced.

The force transferring member 4 is disposed in the hollow interior of the door bottom portion 2a, so that the stiffness of the door bottom portion 2a can be enhanced. This inhibits the door bottom portion 2a from being deformed to inhibit the door 2 from entering the interior. Accordingly, the passenger protectability can be enhanced.

When assuming, for example, a configuration in which the bottom end of the door 2 is disposed at a higher level than that of the upper end of the side sill 3 and the force transferring member 4 is disposed between the sill part 11b and the reinforcement member 32, force transfer between the sill part 11b and the reinforcement member 32 may be advanced, and the detection of the side collision may also be advance. However, such a structure in which the force transferring member 4 is disposed inside the side sill 3 needs to secure a space for the force transferring member 4 between the sill part 11b and the reinforcement member 32, causing an increase in outward size of the sill part 11b in the width direction, which may hinder the accessibility. In contrast, a vehicle body side structure in which the force transferring member 4 is disposed inside the door 2 can suppress the size of the side sill 3 to ensure the accessibility.

(2) The side face portion 11c formed into a sheet shape is disposed on the outer side of the side sill 3 in the width direction. The force transferring member 4 is disposed so as to overlap the side face portion 11c when seen from the side. When a force directing inward in the width direction is input into the door 2, face contact between the door bottom portion 2a and the side face portion 11c secures the contact area between the door bottom portion 2a and the side face portion 11c to promote transferring of a larger force from the force transferring member 4 to the side face portion 11c. This further enhances reliability in detecting side collisions.

Increase in force transferred from the door bottom portion 2a to the side face portion 11c accompanies increase in reaction force that acts on the door bottom portion 2a from the side face portion 11c, so that the door bottom portion 2a can be further surely inhibited from entering inwardly in the width direction. Providing the side face portion 11c on the outer side of the side sill 3 in the width direction advances the contact between the door bottom portion 2a and the side sill 3, so that the side collision force can be transferred to the side sill 3 earlier. Accordingly, the passenger protectability can be further enhanced.

(3) The vertical length L1 of the projection 4f is set shorter than the vertical length L2 of the recess 32b. This setting of the vertical lengths L1, L2 encourages the projection 4f in fitting into the recess 32b and consequently, the door 2 can be further surely inhibited from entering the interior. Accordingly, the passenger protectability can be further enhanced.

(4) Further, the projection 4f is disposed below the recess 32b. This configuration makes the projection 4f to fit into the recess 32b more easily When, for example, the door 2 collides at a portion higher than the portion where the force transferring member 4 locates and the door bottom portion 2a displaces inward in the width direction and upward. A state where the projection 4f is caught by the recess 32b makes it possible to inhibit the door bottom portion 2a from being deformed inward in the width direction and/or vertically. This further ensures the inhibition of the entrance of the door 2 to the interior, so that the passenger protectability can be further enhanced.

(5) The force transferring member 4 is disposed so as to overlap the seat cross members 13, 14 when seen from the side. This configuration makes it possible to efficiently transfer the force input into the door 2 and acting inward in the width direction to the seat cross members 13, 14 through the force transferring member 4 and the side sill 3. Specifically, since the direction of aligning the force transferring member 4, the side sill 3, and the seat cross members 13, 14 conforms to the direction of the side collision force to be input to the door 2, a larger side collision force can be transferred to the seat cross members 13, 14 and also to the backbone 15 as compared with the cases where the force transferring member 4 is disposed higher or lower than the side sill 3 and the seat cross members 13, 14. By enhancing the detection responsiveness of the sensors 17, 18 in such a manner, for example, the reliability in detecting side collisions can be enhanced. Accordingly, the passenger protectability can be further enhanced.

(6) The force transferring member 4 extends between the rear end of the door bottom portion 2a and a position at the front side of the seat 16. This structure can more surely inhibit a portion of the door 2 overlapping passenger(s) in the longitudinal direction when seen from the side, from entering the interior. Extending the force transferring member 4 in the above manner enhances the efficiency of transferring the side collision force input to a portion of the door 2 overlapping the passenger(s) in the longitudinal direction when seen from the side. Thus, when a side collision force directing to the passenger(s) is input to the door 2, the detection responsiveness of the sensors 17, 18 is ensured, for example, and consequently, the occurance of the side collision can be detected earlier. Accordingly, the passenger protectability can be further enhanced.

(7) The force transferring member 4 forms a closed section in the hollow interior of the door bottom portion 2a. This enhances the stiffness of the door bottom portion 2a and therefore further inhibits the door bottom portion 2a from being deformed. In such a case, the force transferring member 4 is also inhibited from being deformed, allowing the force to be transferred to the side sill 3 more rapidly. Accordingly, the passenger protectability can be further enhanced.

(8) Since the force transferring member 4 is formed by bending a steel material, the force transferring member 4 and the door 2 can be formed by the same material. Accordingly, the process of manufacturing the force transferring member 4 can be easily incorporated into the process of manufacturing the door 2 to suppress a rise of manufacturing cost of the vehicle side portion.

(9) The entire portion of the force transferring member 4 is arranged so as to overlap the reinforcement face portion 32a when seen from the side. As such, by setting the height and the size of the force transferring member 4 so as to conform to those of the reinforcement face portion 32a that reinforces the side face portion 11c in the side sill 3, the side collision force can be efficiently transferred to the side sill 3. In this case, the reaction force that acts from the side sill 3 to the door bottom portion 2a increases, and consequently the door bottom portion 2a is more surely inhibited from entering inward in the width direction. Accordingly, the passenger protectability can be further enhanced.

[4. Modification]

The vehicle body structure disclosed herein is not limited to the foregoing embodiment and can be modified without departing the scope of the foregoing embodiment. Each configuration of the foregoing embodiment may be selected, omitted, and/or combined according to the requirement.

Figure 6:
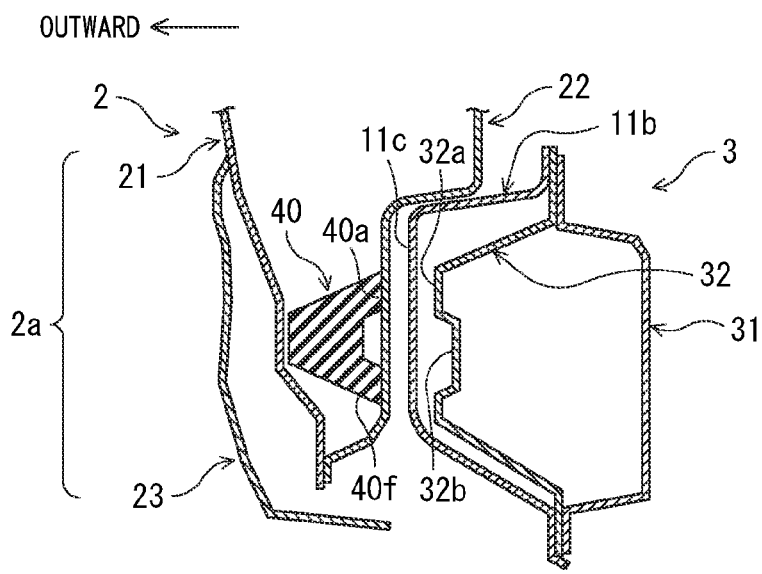
FIG. 6 is a diagram illustrating the section corresponding to that of FIG. 4 when a force transferring member according to a modification is applied.

Although the description of the foregoing embodiment assumes that the force transferring member 4 is formed of a bent steel material and has a hat-shaped section, the force transferring member 4 may be formed by any material and may have any shape. For example, the force transferring member 4 may be replaced with a force transferring member 40 illustrated in FIG. 6. FIG. 6 corresponds to FIG. 4 referred in the foregoing embodiment, and like reference numbers of FIG. 6 designate the same or similar parts and element of FIG. 4.

As illustrated in FIG. 6, the force transferring member 40 of this modification employs material and shape each different from those of the force transferring member 4 of the above embodiment. Hereinafter, description will now be made in relation to the differences of the force transferring member 40 from the force transferring member 4 of the above embodiment, and the description of the common points will be omitted.

The force transferring member 40 is formed of a resin material obtained by foam molding and is a solid member. The force transferring member 40 has a vertical section of a substantial trapezoid. The force transferring member 40 is arranged in the hollow interior of the door bottom portion 2a in such a posture that the upper base of the trapezoid section vertically extends on outer side in the with direction.

The force transferring member 40 is provided with projections 40a, 40f respectively projecting from the top and bottom ends of the lower base of the trapezoid section disposed inward in the width direction toward the interior in the width direction. Between the projections 40a, 40f, the lower projection 40f corresponds to the projection 4f of the foregoing embodiment. This means that when the door bottom portion 2a enters inward in the width direction, the lower projection 40f fits into the recess 32b of the side sill 3 to inhibit the door bottom portion 2a from entering inward in the width direction. The force transferring member 40 forms a closed section in the hollow interior of the door bottom portion 2a with the upper and lower projections 40a, 40b being attached to the door inner panel 22.

This solid force transferring member 40 can enhance the efficiency in transferring the force within the force transferring member 40 as compared to a hollow or plate-shaped force transferring member. Even if being formed of a resin material having lower stiffness and strength than those of a steel material, the force transferring member 40 is able to rapidly transfer the force input into the door 2 and acting inward in the width direction as in the case of the above force transferring member 4 formed of a steel material. In addition, the force transferring member 40 is able to transfer a larger side collision force to the side sill 3 as compared to a structure not having the force transferring member 4, 40. Accordingly, the passenger protectability can be enhanced.

Since this solid force transferring member 40 can easily reserve the volume of the projection 40f, even if being formed of a resin material, the projection 40f secures the stiffness and the strength as those of the above steel projection 4f, and is able to inhibit the door bottom portion 2a from entering inward in the width direction.

Furthermore, being formed of a resin material softer than a steel material, the force transferring member 40 can further contribute to enhancement in passenger protectability as compared to one formed of a steel material.

The projections 4f, 40f do not have to be disposed below the recess 32b. The projections 4f, 40f may be disposed at a level the same as or higher than that of the recess 32b. By disposing the projections 4f, 40f at such heights, when the door bottom portion 2a is deformed horizontally or downward while deforming inward in the width direction, the projections 4f, 40f fit into the recess 32b, and thus, can inhibit the door 2 from entering the interior as the above.

In the configuration assuming the projections 4f, 40f disposed below the recess 32b, when the door bottom portion 2a is deformed downward and inward in the width direction, the upper flange portion 4a and the upper conjunction face portion 4d of the force transferring member 4 or the projection 40a of the force transferring member 40 fits into the recess 32b, so that the door 2 is inhibited from entering the interior.

The force transferring members 4, 40 may be of any appropriate shapes and may not be limited to those having the shapes described above. Examples of the force transferring members 4, 40 may have sections in the form of squares, and the force transferring member 40 may omit either one of the projections 40a, 40f.

The force transferring members 4, 40 may have any vertical lengths, which can be appropriately set. For example, the force transferring members 4, 40 may extend in the entire length of the door bottom portion 2a in the longitudinal direction.

The above embodiment assumes that the entire force transferring member 4 is disposed so as to overlap the reinforcement face portion 32a when seen from the side. Alternatively, it is sufficient that the force transferring member 4 partially overlaps the side sill 3 when seen from the side.

The above description of the foregoing embodiment is made in relation to the vehicle body side structure around the door 2 that closes the forward-side entrance opening of the vehicle 1. The above vehicle body side structure can be applied to the door 2 that closes the rear-side entrance opening of the vehicle 1 in a similar manner.

The installation positions of the sensors 17, 18 for detecting collisions in the foregoing embodiment are merely examples and may be modified. The sensors 17, 18 may be omitted from the present vehicle body side structure. Even when the sensors 17, 18 are omitted, the above vehicle body side structure can rapidly transfer the force directing inward in the width direction to the side sill 3 through the force transferring members 4, 40 and also can inhibit the door 2 from entering inward in the width direction, so that the passenger protectability can be enhanced.

REFERENCE SIGN LIST

1 vehicle
2 door
2a door bottom portion
3 side sill
4, 40 force transferring member
4f, 40f projection
11c side face portion
13 seat front cross member (cross member)
14 seat rear cross member (cross member)
32b recess
L1 vertical length of projection
L2 vertical length of recess

The invention claimed is:

1. A vehicle body side structure comprising:
a side sill extending in a longitudinal direction of a vehicle at a side bottom of the vehicle and having a recess extending in the longitudinal direction of the vehicle and sagging inward in a width direction of the vehicle and extending in the longitudinal direction;
a door being hollow, having a door bottom portion disposed so as to overlap the side sill when seen from a side, and being arranged at an outer side of the side sill in the width direction; and
a force transferring member having a projection protruding inward in the width direction, being disposed in a hollow interior of the door bottom portion, and being configured to transfer force acting inward in the width direction to the side sill,
wherein the recess receives the projection upon a side collision of the vehicle.

2. The vehicle body side structure according to claim 1, wherein:
the side sill has a side face portion formed into a sheet shape on an outer side of the side sill in the width direction; and
the force transferring member is disposed so as to overlap the side face portion when seen from the side.

3. The vehicle body side structure according to claim 1, wherein a vertical length of the projection is set shorter than a vertical length of the recess.

4. The vehicle body side structure according to claim 2, wherein a vertical length of the projection is set shorter than a vertical length of the recess.

5. The vehicle body side structure according to claim 1, wherein the projection is disposed below the recess.

6. The vehicle body side structure according to claim 2, wherein the projection is disposed below the recess.

7. The vehicle body side structure according to claim 3, wherein the projection is disposed below the recess.

8. The vehicle body side structure according to claim 1, wherein:
the side sill is bound together with a cross member extending in the width direction; and
the force transferring member is disposed so as to overlap the cross member when seen from the side.

9. The vehicle body side structure according to claim 2, wherein:
the side sill is bound together with a cross member extending in the width direction; and
the force transferring member is disposed so as to overlap the cross member when seen from the side.

10. The vehicle body side structure according to claim 3, wherein:
the side sill is bound together with a cross member extending in the width direction; and
the force transferring member is disposed so as to overlap the cross member when seen from the side.

11. The vehicle body side structure according to claim 5, wherein:
the side sill is bound together with a cross member extending in the width direction; and the force transferring member is disposed so as to overlap the cross member when seen from the side.

12. The vehicle body side structure according to claim 1, wherein the force transferring member extends between a rear end of the door bottom portion and a position at a front side of a seat installed in the vehicle.

13. The vehicle body side structure according to claim 2, wherein the force transferring member extends between a rear end of the door bottom portion and a position at a front side of a seat installed in the vehicle.

14. The vehicle body side structure according to claim 3, wherein the force transferring member extends between a rear end of the door bottom portion and a position at a front side of a seat installed in the vehicle.

15. The vehicle body side structure according to claim 5, wherein the force transferring member extends between a rear end of the door bottom portion and a position at a front side of a seat installed in the vehicle.

16. The vehicle body side structure according to claim 8, wherein the force transferring member extends between a rear end of the door bottom portion and a position at a front side of a seat installed in the vehicle.

17. The vehicle body side structure according to claim 1, wherein the force transferring member forms a closed section in the hollow interior of the door bottom portion.

18. The vehicle body side structure according to claim 1, wherein the force transferring member comprises a resin material formed by foam molding.

19. The vehicle body side structure according to claim 1, wherein the force transferring member comprises a steel formed by bending.

20. The vehicle body side structure according to claim 1, wherein the force transferring member is a solid member.

* * * * *